(12) United States Patent
Cavallin et al.

(10) Patent No.: US 8,748,550 B2
(45) Date of Patent: Jun. 10, 2014

(54) VINYL POLYMER WETTING AND DISPERSING AGENT

(75) Inventors: Carl Lewis Cavallin, Albertville, MN (US); Archie W. Garner, Ham Lake, MN (US); David R. Wallace, Louisville, KY (US); T. Howard Killilea, North Oaks, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 277 days.

(21) Appl. No.: 13/255,862

(22) PCT Filed: Mar. 12, 2010

(86) PCT No.: PCT/US2010/027224
§ 371 (c)(1),
(2), (4) Date: Sep. 9, 2011

(87) PCT Pub. No.: WO2010/105219
PCT Pub. Date: Sep. 16, 2010

(65) Prior Publication Data
US 2012/0004359 A1   Jan. 5, 2012

Related U.S. Application Data

(60) Provisional application No. 61/160,190, filed on Mar. 13, 2009.

(51) Int. Cl.
*C08F 226/06* (2006.01)
*C08L 39/04* (2006.01)

(52) U.S. Cl.
USPC .......................... 526/258; 524/548

(58) Field of Classification Search
USPC .......................... 524/548; 526/258
See application file for complete search history.

(56) References Cited

U.S. PATENT DOCUMENTS

| | | |
|---|---|---|
| 3,684,771 A | 8/1972 | Braun |
| 4,243,797 A | 1/1981 | Petersen et al. |
| 4,349,663 A * | 9/1982 | Barsa et al. ............ 528/367 |
| 4,427,835 A | 1/1984 | Bush et al. |
| 4,435,559 A | 3/1984 | Valko |
| 4,468,498 A | 8/1984 | Kowalski et al. |
| 4,469,825 A | 9/1984 | Kowalski et al. |
| 4,594,363 A | 6/1986 | Blankenship et al. |
| 4,735,984 A | 4/1988 | Gouji et al. |
| 4,880,842 A | 11/1989 | Kowalski et al. |
| 4,906,727 A | 3/1990 | Fischer et al. |
| 4,920,160 A | 4/1990 | Chip et al. |
| 4,985,064 A | 1/1991 | Redlich et al. |
| 5,036,109 A | 7/1991 | Chip et al. |
| 5,041,464 A | 8/1991 | Hoshino et al. |
| 5,157,084 A | 10/1992 | Lee et al. |
| 5,244,979 A | 9/1993 | Yamamoto et al. |
| 5,270,399 A | 12/1993 | Czornij et al. |
| 5,324,756 A | 6/1994 | Gebregiorgis |
| 5,409,776 A | 4/1995 | Someya et al. |
| 5,510,422 A | 4/1996 | Blankenship et al. |
| 5,603,865 A | 2/1997 | DePue et al. |
| 5,852,123 A | 12/1998 | Huybrechts |
| 6,262,207 B1 | 7/2001 | Rao et al. |
| 6,300,410 B1 | 10/2001 | Shachat et al. |
| 6,350,307 B1 | 2/2002 | Linke et al. |
| 6,472,463 B1 | 10/2002 | Ma |
| 6,495,618 B1 | 12/2002 | Ma |
| 6,521,715 B1 | 2/2003 | Ma |
| 6,582,803 B2 | 6/2003 | Cole et al. |
| 6,852,803 B2 | 2/2005 | Ma |
| 7,335,699 B2 | 2/2008 | Dziwok et al. |
| 7,417,102 B2 | 8/2008 | Ohrbom et al. |
| 8,476,428 B2 * | 7/2013 | Hedrick et al. ............ 544/97 |
| 2006/0165638 A1 | 7/2006 | Zuazo et al. |
| 2006/0217485 A1 | 9/2006 | Ohrbom et al. |
| 2008/0139738 A1 | 6/2008 | Ma |
| 2008/0139739 A1 | 6/2008 | Ma |
| 2008/0311415 A1 | 12/2008 | Castaing et al. |
| 2009/0234062 A1 | 9/2009 | Kok et al. |

FOREIGN PATENT DOCUMENTS

| | | | |
|---|---|---|---|
| GB | 1 393 401 | * | 5/1975 |
| KR | 10-0181010 B1 | | 3/1999 |
| WO | WO 99/05225 | | 2/1999 |
| WO | WO 2004/045755 A2 | | 6/2004 |

* cited by examiner

*Primary Examiner* — Robert D. Harlan
(74) *Attorney, Agent, or Firm* — IPLM Group, P.A.

(57) ABSTRACT

A vinyl polymer pigment dispersing agent having a vinyl addition polymer backbone, one or more polymer side chains with pendant cyclic urea functional group(s) separated from the polymer backbone by at least 10 intervening atoms, and in some embodiments one or more polymer side chains comprising pendant urea functional groups separated from the polymer back-bone by less than 10 intervening atoms. The dispersing agent may be made by addition polymerizing a mixture of one or more vinyl monomers and one or more monomers having cyclic urea functional groups and vinyl functional groups. The dispersing agent may be combined with pigment particles, a carrier and an optional surfactant to make a pigment grind dispersion with excellent pigment wetting and dispersing properties.

41 Claims, No Drawings

VINYL POLYMER WETTING AND DISPERSING AGENT

CROSS REFERENCE TO RELATED APPLICATION

This application is national stage filing under 35 U.S.C. §371 of International Application No. PCT/US2010/027224 filed Mar. 12, 2010, which claims priority under 35 U.S.C. §119 to U.S. Provisional Application No. 61/160,190 filed Mar. 13, 2009, the disclosures of which are incorporated herein by reference.

FIELD

This invention relates to pigment wetting and dispersing agents.

BACKGROUND

A variety of polymers have been proposed for use as pigment dispersing agents. Synthesis of some of these polymers requires expensive starting monomers or complex synthetic schemes. In other instances the polymers have high viscosities, limited pigment dispersing capabilities or other drawbacks.

SUMMARY OF THE INVENTION

The present invention provides, in one aspect, a vinyl polymer pigment dispersing agent comprising a solution polymer or water-dispersible polymer having:
a) a vinyl addition polymer backbone;
b) one or more polymer side chains comprising a pendant cyclic urea functional group separated from the polymer backbone by at least 10 intervening atoms; and
c) one or more polymer side chains comprising pendant urea functional groups separated from the polymer backbone by less than 10 intervening atoms.

The invention provides, in another aspect, a method for making a vinyl polymer pigment dispersing agent, which method comprises forming a solution polymer or water-dispersible polymer by addition polymerizing a mixture comprising:
a) one or more vinyl monomers;
b) one or more other monomers having cyclic urea functional groups and vinyl functional groups separated from one another by at least 10 intervening atoms; and
c) one or more other monomers having pendant urea functional groups and vinyl groups separated from one another by less than 10 intervening atoms.

The present invention provides, in yet another aspect, a pigment grind dispersion comprising a stable blend of:
a) a vinyl polymer pigment dispersing agent comprising a solution polymer or water-dispersible polymer having:
 i) a vinyl addition polymer backbone; and
 ii) one or more polymer side chains comprising a pendant cyclic urea functional group separated from the polymer backbone by at least 10 intervening atoms;
b) pigment particles; and
c) a carrier.

The disclosed pigment dispersing agent has low viscosity and may be easily synthesized, yet has very good pigment wetting and dispersion capabilities.

DETAILED DESCRIPTION

Unless the context indicates otherwise the following terms shall have the following meaning and shall be applicable to the singular and plural:

The terms "a," "an," "the," "at least one," and "one or more" are used interchangeably. Thus, for example, a pigment grind dispersion that contains "a" carrier or "an" optional surfactant means that the dispersion may include "one or more" carriers and "one or more" optional surfactants.

The term "acid number" means the milligrams of potassium hydroxide required to neutralize one gram of polymer solids, and may be evaluated according to ASTM D974-04.

The term "binder" when used in respect to a liquid coating composition means a film-forming natural or synthetic polymer suitable for use in such a composition.

The term "carrier" when used in respect to a coating composition or pigment grind dispersion means a volatile solvent or other vehicle for the remaining components of the composition.

The term "functional" when used with respect to a urea group means a urea-containing substituent group in a polymer enabling such polymer to assist in suspending or dispersing pigment in a carrier, and when used with respect to a vinyl group means a site of ethylenic unsaturation in a monomer or oligomer enabling such monomer or oligomer to participate in addition polymerization.

The terms "group" and "moiety" are used to differentiate between chemical species that allow for substitution or that may be substituted and those that do not allow or may not be so substituted. Thus, when the term "group" is used to describe a chemical substituent, the described substituent includes the unsubstituted group and that group with O, N, Si, or S atoms, for example, in the chain (e.g., as in an alkoxy group) as well as that group with carbonyl or other conventional substituents. When the team "moiety" is used to describe a chemical compound or substituent, only an unsubstituted chemical material or substituent is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. The term "alkyl group" encompasses the term "alkyl moiety", and the disclosure of any particular group is also intended to be an explicit disclosure of the corresponding moiety of that particular group.

The term "hydroxyl number" means the milligrams of potassium hydroxide required to neutralize one gram of polymer solids whose hydroxyl groups have been acetylated using acetic anhydride, and may be evaluated according to ASTM D 1957-86 (Reapproved 2001).

The term "intervening" when used with respect to the number of atoms between a urea functional group and a vinyl functional group refers to the number of atoms in the shortest path between the urea functional group and vinyl functional group, not counting the nearest nitrogen atom in the urea functional group or the nearest backbone atom in the vinyl functional group.

The term "latex" when used in respect to a polymer means an emulsion of polymer particles in water in which the polymer is not itself capable of being dispersed in water; rather, a latex polymer requires a secondary emulsifying agent (e.g., a surfactant) to form the emulsion.

The term "pigment" when used in respect to a coating composition or pigment grind dispersion means a particulate material which imparts one or more of color (including black), visual effect or opacity to the composition or dispersion.

The term "pigment volume concentration" when used in respect to a coating composition means the total percentage of dried coating volume occupied by all pigment species in the coating.

The term "polymer" includes both homopolymers and copolymers (viz., polymers of two or more different monomers).

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "solvent-borne" when used in respect to a coating composition or pigment grind dispersion means that the major carrier is a nonaqueous solvent or mixture of nonaqueous solvents.

The term "stable" when used in respect to a pigment grind dispersion means that the dispersion forms a homogeneous suspension of pigment particles which remain sufficiently well-dispersed to permit room temperature storage for an extended period of time (e.g., at least three months, and preferably without visible settling), so that the dispersion need not be remixed in order accurately to be combined with other ingredients to provide a desired paint, stain or industrial coating.

When used with respect to a component which may be found in a coating composition or pigment grind dispersion, the term "substantially free of" means containing less than about 1 weight percent of the component based on the coating composition or pigment grind dispersion weight.

The term "water-borne" when used in respect to a coating composition or pigment grind dispersion means that the major carrier is water.

The term "water-dispersible" when used in respect to a polymer means that without requiring the use of a separate surfactant, the polymer is itself capable of being dispersed into water or water can be added to the polymer to form a stable aqueous dispersion having at least one month shelf stability at normal storage temperatures. Such water-dispersible polymers may include nonionic or ionic functionality on the polymer to assist in rendering it water-dispersible. For such polymers, external acids or bases are typically required for ionic stabilization; however, these are not secondary emulsifying agents (e.g., surfactants) such as are required to form a latex polymer emulsion.

The recitation of a numerical range using endpoints includes all numbers subsumed within that range (e.g., 1 to 5 includes 1, 1.5, 2, 2.75, 3, 3.80, 4, 5, etc.).

A variety of vinyl monomers or oligomers may be used to form the disclosed vinyl polymer. The vinyl monomers or oligomers include one or more (and preferably exactly one) ethylenically unsaturated groups, and preferably include one or more (and more preferably exactly one) terminal ethylenically unsaturated groups. The vinyl polymer may include a variety of functional groups aside from the cyclic urea and urea functional groups discussed in more detail below, for example hydroxyl groups; acid groups such as carboxylic acid, sulfonic acid or phosphoric acid groups; amide groups; amine groups; silane groups; alkoxysilane groups; epoxy groups; acetoacetoxy groups and the like.

Exemplary vinyl monomers and oligomers include styrene; substituted styrenes (e.g., vinyltoluene, para-t-butylstyrene, para-methylstyrene or divinylbenzene); unsaturated acids and esters (e.g., acrylic acid, methacrylic acid and their esters including acrylates and methacrylates); acrylamides; acrylonitriles; allyl compounds (e.g., diallyl phthalate and 2,4,6-Triallyloxy-1,3,5-triazine); vinyl ethers and the like. Exemplary esters of unsaturated acids may be formed by reacting unsaturated acids with straight chain, cyclic or aromatic alcohols or polyols or their derivatives having 1 or more (e.g., 1 to 18) carbon atoms, or by reacting unsaturated alcohols with straight chain, cyclic or aromatic carboxylic acids or polyacids or their derivatives having 1 or more (e.g., 1 to 18) carbon atoms. Vinyl polymers derived at least in part from one or more styrenes, acrylates or methacrylates are preferred.

Exemplary acrylates and methacrylates include methyl methacrylate (MMA), ethyl methacrylate, 2-hydroxyethyl methacrylate (2-HEMA), methacryloxyethyl phosphate, sulfoethyl methacrylate, n-propyl methacrylate, isopropyl methacrylate, 2-hydroxypropyl methacrylate, n-butyl methacrylate, isobutyl methacrylate, t-butyl methacrylate, 4-hydroxylbutyl methacrylate, 2-ethyl hexyl methacrylate, isodecyl methacrylate, lauryl methacrylate, stearyl methacrylate, behenyl methacrylate, ethylene glycol dimethacrylate (EGDMA), triethylene glycol dimethacrylate (TEGDMA), polypropylene glycol dimethacrylate (PPGDMA), dipropylene glycol dimethacrylate, 1,3- and 1,4-butanediol dimethacrylate, polyethylene glycol dimethacrylate (PEGDMA), 1,3-butylene glycol dimethacrylate, 1,6 hexane diol dimethacrylate (HDDMA), trimethylolpropane trimethacrylate (TMPTMA), tetramethylolpropane trimethacrylate, acetoacetoxyethyl methacrylate (AAEM), glycidyl methacrylate, trimethylcyclohexyl methacrylate, cyclohexyl methacrylate, t-butyl cyclohexyl methacrylate, isobornyl methacrylate, t-butyl cyclohexyl methacrylate, phenyl methacrylate, benzyl methacrylate, the acrylate counterparts thereof and mixtures thereof. Exemplary acrylamides and acrylonitriles include methacrylamide, methoxy methacrylamide, methoxy methyl methacrylamide, n-butoxy methyl methacrylamide, methacrylonitrile, and the like. In some embodiments, the vinyl polymer desirably is at least partially derived from one or more fatty acid (meth)acrylates, e.g., up to about 25 weight percent based on the starting vinyl monomers or oligomers A variety of synthetic approaches may be used to form the disclosed vinyl polymer dispersing agents. A preferred approach is to addition polymerize a mixture containing one or more vinyl monomers or oligomers, one or more monomers or oligomers having cyclic urea functional groups and vinyl functional groups separated from one another by at least 10 intervening atoms, and in certain embodiments one or more monomers having pendant urea functional groups separated from the polymer backbone by less than 10 intervening atoms.

The monomers or oligomers with cyclic urea functional groups and vinyl functional groups separated from one another by at least 10 intervening atoms may conveniently be formed by combining a hydroxyl-functional vinyl monomer, a di- or higher-functional isocyanate and an active hydrogen group-containing cyclic urea to form a di- or higher-functional urethane monomer or oligomer having a pendant and preferably terminal cyclic urea group separated by at least 10 intervening atoms from a pendant and preferably terminal vinyl group. The intervening atoms may for example be carbon, nitrogen, oxygen, phosphorus, sulfur, silicon or boron atoms, and may form combinations such as urethane linkages. The number of intervening atoms may for example be at least 12, at least 14 or at least 16, and may also be for example less than 40, less than 30, less than 24 or less than 20 intervening atoms. Vinyl polymer pigment dispersing agents made from such a monomer or oligomer will have a vinyl addition polymer backbone and one or more polymer side chains (which for brevity may be referred to as "Long Urea Side Chains") comprising a pendant cyclic urea functional group separated from the polymer backbone by at least 10 intervening atoms.

Exemplary hydroxyl-functional vinyl monomers for making Long Urea Side Chains include 2-HEMA, 2-hydroxypropyl methacrylate, 4-hydroxylbutyl methacrylate and allyl alcohol. In place of the hydroxyl-functional vinyl monomers, other vinyl monomers having active hydrogen atoms may be employed, for example 2-aminopropyl methacrylate.

Exemplary isocyanates for making Long Urea Side Chains include aliphatic, alicyclic and aromatic isocyanates. The isocyanate may be monomeric, oligomeric or polymeric. Preferred isocyanates have at least two (and more preferably exactly two) isocyanate groups in the molecule, preferably of differing reactivity, and may be represented by the general formula I shown below:

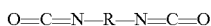

where R preferably represents a divalent organic group, more preferably a saturated aliphatic hydrocarbon group, saturated alicyclic hydrocarbon group or aromatic hydrocarbon group. Representative monomeric diisocyanates include 1,6-hexamethylene diisocyanate, isophorone diisocyanate (IPDI), 4,4'-biphenylene diisocyanate, toluene diisocyanate, cyclohexyl diisocyanate, tetramethyl xylylene diisocyanate, ethylethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis-(4-isocyanatocyclohexyl)-methane, 4,4'-diisocyanatodiphenyl ether, and the like. Representative oligomeric or polymeric isocyanates include diphenylmethane diisocyanate (MDI) polymers such as MONDUR™ MR, MONDUR MRS, MONDUR 582 and other grades of MONDUR polymeric isocyanates commercially available from Bayer Corporation, and the PAPI™ 27, PAPI 94, PAPI 95, PAPI 901 and other grades of PAPI polymeric isocyanates commercially available from Dow Chemical Co.; toluene diisocyanate (TDI) polymers such as toluene diisocyanate dimers and trimers; and isocyanate-terminated prepolymers formed by reacting a polyol, polyether polyol or polyester polyol with a stoichiometric excess of one or more polyisocyanates. Polyols for preparing such prepolymers include those listed in U.S. Pat. No. 4,435,559. The isocyanate may also be an isocyanate trimer, and may for example be reacted with one mole of hydroxyl-functional vinyl monomer and two moles of hydroxy-functional cyclic urea per mole of isocyanate trimer.

A preferred class of active hydrogen group-containing cyclic ureas for making Long Urea Side Chains may be represented by the general formula II shown below:

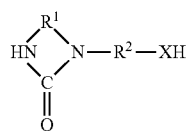

wherein:

$R^1$ is alkylene having 2 or 3 carbon atoms;
$R^2$ is alkylene having about 2 to about 10 (e.g., 2 or 3) carbon atoms;
X is oxygen, sulfur or $NR^3$ where $R^3$ is hydrogen, alkyl (including substituted alkyl), alicyclic (including substituted alicyclic), aryl (including substituted aryl), heteroalkyl, or heterocyclic.

Hydroxy-functional cyclic ureas are an especially preferred subclass of such active hydrogen group-containing cyclic ureas, and include hydroxyethylethylene urea (HEEU). Amino-functional cyclic ureas are another preferred subclass, and include N-aminoethylene urea and N-aminoethylethylene urea.

Some embodiments of the disclosed vinyl polymer pigment dispersing agents may also include pendant urea functional groups separated from the polymer backbone by less than 10 intervening atoms. The vinyl polymer pigment dispersing agents of such embodiments have a vinyl addition polymer backbone, one or more Long Urea Side Chains, and one or more polymer side chains (which for brevity may be referred to as "Short Urea Side Chains") comprising a pendant urea functional group separated from the polymer backbone by less than 10 intervening atoms. The intervening atoms may for example be carbon, nitrogen, oxygen, phosphorus, sulfur, silicon or boron atoms or combinations thereof including a urethane linkage. The number of intervening atoms may for example be less than 9, less than 8, less than 7 or less than 6 intervening atoms. Preferably the Short Urea Side Chains contain cyclic urea groups, and preferably the separation is less than 5 intervening atoms. A convenient way to incorporate Short Urea Side Chains in the vinyl polymer is to prepare the vinyl polymer from a reaction mixture including one or more monomers having pendant and preferably terminal urea functional groups and pendant and preferably terminal vinyl functional groups separated from one another by less than 10 intervening atoms. A preferred class of such monomers may be represented by the general formula III shown below:

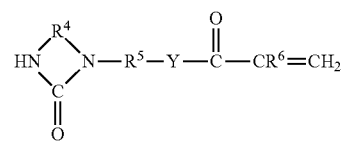

wherein:
$R^4$ is alkylene having 2 or 3 carbon atoms;
$R^5$ is alkylene having about 2 to 7 (e.g., 2 or 3) carbon atoms;
$R^6$ is hydrogen or methyl;
Y is oxygen, sulfur or $NR^7$ where $R^7$ is hydrogen, alkyl (including substituted alkyl), alicyclic (including substituted alicyclic), aryl (including substituted aryl), heteroalkyl, or heterocyclic.

A preferred subclass of such monomers includes hydroxyethylethylene urea acrylate (HEEUA), hydroxyethylethylene urea methacrylate (HEEUMA), acrylamidoethylethylene urea and methacrylamidoethylethylene urea. Short Urea Side chains may also be incorporated by forming a vinyl polymer containing active hydrogen atoms (e.g., hydroxyl groups) disposed along the polymer backbone, reacting the polymer with a diisocyanate and then with ammonia or a primary or secondary amine, using techniques similar to those described in U.S. Pat. No. 6,582,803 B2.

The disclosed vinyl polymer pigment dispersing agents may provide very effective pigment wetting and dispersion using relatively low and thus economical amounts of polymer side chains containing urea functional groups, e.g., less than 5 weight percent or less than 2 weight percent of such side chains based on the vinyl polymer weight. The Long Urea Side Chain amount may for example be less than 5 weight percent or less than 2 weight percent of the vinyl polymer weight. Expressed in terms of the number of side chains per polymer unit and using a polymer with a weight average molecular weight of about 7,000 as the basis for an exemplary calculation, there may for example be less than 1, less than 0.8, less than 0.5 or less than 0.2 Long Urea Side Chains per polymer unit.

Vinyl polymers having a mix of Long Urea Side Chains and Short Urea Side Chains may provide especially desirable pigment dispersing capabilities. There may for example be the number of Long Urea Side Chains per polymer unit discussed above and less than 1, less than 0.8, less than 0.5 or less than 0.2 Short Urea Side Chains per polymer unit. As the percentage of Long Urea Side Chains in such vinyl polymers is increased, the percentage of Short Urea Side Chains may be decreased, with the Long Urea Side Chains appearing to provide roughly twice the dispersing power as the Short Urea Side Chains when the starting monomers or oligomers are compared on weight basis. In one embodiment, the vinyl polymer contains less than 2 weight percent Long Urea Side Chains and less than 2 weight percent Short Urea Side Chains. In another embodiment, the vinyl polymer contains about 0.11 Long Urea Side Chains and about 0.16 Short Urea Side Chains per polymer unit and has a number average molecular weight of about 3,150 and a weight average molecular weight of about 7,245. If the Long Urea Side Chains are excluded from this latter embodiment, then approximately 0.8 Short Urea Side Chains per polymer unit are required to obtain comparable pigment dispersing performance.

The vinyl polymer may have a variety of molecular weights. Preferably the molecular weight is sufficiently small so that the polymer will have low viscosity and good pigment wetting characteristics. The vinyl polymer may for example have a weight average molecular weight greater than about 2,000, greater than about 5,000 or greater than about 7,000, and may also have a weight average molecular weight less than about 200,000, less than about 50,000, less than about 20,000, less than about 10,000 or less than about 8,000 as measured using gel permeation chromatography and a polystyrene standard.

In some embodiments the vinyl polymer may for example have a hydroxyl number less than about 200, less than about 100 or less than about 60. In some embodiments the vinyl polymer may for example have a hydroxyl number greater than 0, greater than about 20 or greater than about 30.

In some pigment grind dispersion embodiments (e.g., in some solvent-borne embodiments) the vinyl polymer is a solution polymer with for example an acid number less than about 20, less than about 10, less than about 5 or less than about 2. In other pigment grind dispersion embodiments (e.g., in some water-borne embodiments) the vinyl polymer is water-dispersible (as provided or via the addition of an appropriate neutralization agent) and may for example have an acid number of 0 to about 200, about 20 to about 200, about 30 to about 150 or about 40 to about 100.

The vinyl polymer may be formed in (or may be combined with) one or more solvents or carriers. Exemplary solvents or carriers include esters such as ethyl acetate and butyl acetate; ketones such as methyl ethyl ketone, methyl isobutyl ketone, methyl n-amyl ketone, and acetone; alcohols such as methanol, ethanol, isopropanol, and butanol; glycols such as ethylene glycol and propylene glycol; ethers such as tetrahydrofuran, ethylene glycol monobutyl ether, and propylene glycol methyl ether; and mixed ether acetates such as propylene glycol methyl ether acetate, diethylene glycol monobutyl ether acetate, and water.

The vinyl polymer may be formed using one or more addition polymerization catalysts. Exemplary catalysts include peroxy and azo derivatives. Exemplary peroxy catalysts include t-butyl peroxy-2-ethylhexanoate, di-t-butyl peroxide, di-cumyl peroxide, tertiary amyl peroxide, cumene hydroperoxide, di(n-propyl)peroxydicarbonate, tertiary amyl peracetate, and the like. Exemplary azo catalysts include 2,2-azobis(2-methylisobutyronitrile), 2,2-azobis(2-methylbutanenitrile), 2,2-azobis(2,4-dimethyl pentanenitrile), 2,2-azobis(2,4-dimethyl-4-methoxyvaleronitrile) and the like.

The disclosed pigment grind dispersions may be made by blending together the disclosed vinyl polymer pigment dispersing agent, pigment particles, a carrier and an optional surfactant, to provide a stable blend. In some embodiments the pigment grind dispersion may contain one or more binders other than the vinyl polymer, and in other embodiments the pigment grind dispersion is substantially free of such binders. The pigment grind dispersing process imparts considerable shear to the vinyl polymer, and care may need to be taken during mixing to prevent or limit undue shear-induced coagulation or other polymer degradation. The disclosed solution polymers and water-dispersible polymers appear to have greater resistance to shear-induced coagulation than latex polymers made using the same monomers. The disclosed pigment grind dispersions desirably are substantially free of latex binders.

A variety of pigments may be employed in the disclosed pigment grind dispersions. The pigments desirably form a stable dispersion that does not require agitation prior to use. In some instances a suitable pigment may also or instead be referred to commercially as a dye. Exemplary pigments include treated or untreated inorganic pigments and mixtures thereof, for example metallic oxides including titanium dioxide, iron oxides of various colors (including black) and zinc oxide; and metallic flakes such as aluminum flakes, pearlescent flakes, and the like. Exemplary pigments also or instead include treated or untreated organic pigments and mixtures thereof, for example carbon black, azo pigments, benzimidazolinones, carbazoles such as carbazole violet, indanthrones, isoindolinones, isoindolons, perylenes, phthalocyanines, quinacridones and thioindigio reds. The pigments may also include filler pigments such as talc, china clay, barytes, carbonates, silicates and mixtures thereof, for example magnesium silicates, calcium carbonate, aluminosilicates, silica and various clays; organic pigments including plastic pigments such as solid bead pigments (e.g., polystyrene or polyvinyl chloride beads) and microsphere pigments containing one or more voids and vesiculated polymer particles (e.g., those discussed in U.S. Pat. Nos. 4,427,835, 4,920,160, 4,594,363, 4,469,825, 4,468,498, 4,880,842, 4,985,064, 5,157,084, 5,041,464, 5,036,109, 5,409,776, and 5,510,422). Other exemplary pigments include EXPANCEL™ 551DE20 acrylonitrile/vinyl chloride expanded particles (from Expancel Inc.), SIL-CEL™ 43 glass micro cellular fillers (from Silbrico Corporation), FILLITE™ 100 ceramic spherical particles (from Trelleborg Fillite Inc.), SPHERICEL™ hollow glass spheres (from Potter Industries Inc.), 3M ceramic microspheres including grades G-200, G-400, G-600, G-800, W-210, W-410, and W-610 (from 3M), 3M hollow microspheres including 3M Performance Additives iM30K (also from 3M), INHANCE™ UH 1900 polyethylene particles (from Fluoro-Seal Inc.), and BIPHOR aluminum phosphate (from Bunge Fertilizantes S.A., Brazil). Suitable pigments are commercially available from a variety of other suppliers including BASF, the LANXESS Inorganic Pigment Business Unit of Bayer Corp., Cabot Corp, Ciba Specialty Chemicals, Clariant, Ferro Corporation, Shepherd Color Company, Sun Chemical and Tomatec America, Inc. The pigments are used in an amount sufficient to provide a suitably tinted and if need be suitably opaque cured final paint, stain or industrial coating at the desired coating thickness level, e.g., at pigment volume concentrations of about 0.25 to about 95 volume percent.

A variety of carriers may be used in the disclosed pigment grind dispersions. Exemplary carriers include the solvents and carriers discussed above in connection with formation of the vinyl polymer.

The disclosed pigment grind dispersions may include one or more optional surfactants. Suitable surfactants will be familiar to persons having ordinary skill in the art, and include cationic, anionic, nonionic and amphoteric surfactants.

Expressed on a weight basis, the pigment grind dispersion may for example contain about 15 to about 80 weight percent vinyl polymer, about 5 to about 80 weight percent pigment, about 5 to about 70 weight percent carrier, and zero to about 30 weight percent surfactant. These amounts may however depend upon a variety of factors including the pigment type, density, surface area and oil absorption value.

The disclosed pigment grind dispersion may be combined with one or more binders to form a finished paint, stain or industrial coating. Exemplary binders may be in a variety of forms including latex polymers and solution polymers, e.g., acrylic copolymers, styrene/acrylic copolymers, vinyl acetate copolymers, vinyl acetate/acrylic copolymers, vinyl versatic acid ester/acrylic copolymers, ethylene/vinyl acetate copolymers, styrene/butadiene copolymers, polyesters, drying oil modified polymers such as polyesters and polyurethanes, polyamides, epoxy esters, polyureas, polyurethanes, polysiloxanes, silicones, fluorinated copolymers such as vinylidene fluoride, and blends of any of the above polymeric binders. The binder may include a component or components of a multicomponent (e.g., two component) reactive system such as a component of an isocyanate-polyamine, isocyanate-polyol, epoxy-polyamine, carbodiimide-polyacid, aziridine-polyacid, melamine-polyol, or urea formaldehyde-polyol coating system. The binder may for example represent about 5 to about 99 volume percent of the dried coating volume. The volume solids, as defined by the fractional volume of dry ingredients in an as-supplied coating composition, may for example represent about 5 to about 80 volume percent of the coating composition. The pigment volume concentration, as defined by the fractional volume of pigment in a dried coating, may for example represent about 0.1 to about 95 volume percent of the coating. In some embodiments, the pigment volume concentration desirably is about 0.1 to about 30 volume percent, about 0.5 to about 25 volume percent, or about 1 to about 25 volume percent. The glass transition temperature for the polymeric binder may for example be about −130 to about 350° C., preferably about −20 to about 150° C., and more preferably about 0 to about 100° C. The coating composition paint viscosity may for example be about 10 to 100,000 cps at 25° C. as measured using a BROOKFIELD™ viscometer and Spindle No. 4 operated at 20 rpm.

It may be desirable to add other optional ingredients to the pigment dispersion such as antioxidants, flow control agents, UV stabilizers, light quenchers and absorbers, and rheology control agents such as fumed silica and microgels. Additional film fainting polymers may also be added such as acrylics, acrylourethanes, polyester urethanes, polyesters, alkyds, polyethers and the like. The disclosed pigment dispersions preferably are universal dispersions whose vehicles and other ingredients render them suitable for use in solvent-borne and water-borne paint, stain or industrial coating compositions.

The disclosed pigment dispersions may be used to form or may be added to a variety of coating compositions including primers, primer surfacers, topcoats (including monocoats), and basecoats for clearcoat/basecoat finishes. These coating compositions may contain crosslinking agents including blocked isocyanates, alkylated melamines, polyisocyanates, epoxy resins, and the like, and may be solvent-borne or water-borne. A variety of vehicles or carriers may be employed in solvent-borne or water-borne embodiments. Exemplary solvents and carriers include those mentioned above. A variety of volatile organic compounds or VOCs may be added to water-borne embodiments to improve coating properties or to aid in coating application, including glycol ethers, organic esters, aromatic compounds, and ethylene or propylene glycols. The disclosed paint, stain and colorant coating compositions preferably are low VOC dispersions containing 0.01 to less than 8 weight percent VOCs, more preferably 0.01 to less than 6 weight percent VOCs, yet more preferably 0.01 to less than 4 weight percent VOCs, and most preferably 0.01 to less than 2 weight percent VOCs based upon the total liquid composition weight.

The disclosed paints, stains and industrial coating compositions may include a variety of adjuvants, including but not limited to adhesion promoters, antioxidants, biocides, buffers, coalescing agents, defoamers, dispersants, dyes, extender fillers, humectants, leveling agents, neutralizers, optical brighteners, pearlescents, plasticizers, polymeric additives, preservatives, reactive diluents, rheology modifiers or thickeners, surfactants, tackifiers, ultraviolet stabilizers (e.g., hindered amine light stabilizers) and waxes.

The disclosed paints, stains and industrial coatings may be applied to a variety of substrates. Exemplary substrates include cement, cement fiberboard, concrete, metal, plastic and wood (including monolithic, engineered and veneered wood).

The invention is further described in the following Examples, in which all parts and percentages are by weight unless otherwise indicated.

Example 1

A vinyl functional cyclic urea monomer with terminal cyclic urea and vinyl functional groups was prepared by reacting 2-HEMA, IPDI and HEEU in a 1:1:1 molar ratio. The IPDI is charged to a reactor equipped with a mixer, thermocouple, condenser and an inert gas inlet. A solvent (which preferably includes an aprotic organic solvent and may include vinyl monomers) is charged to the reactor. When utilizing vinyl monomers as a solvent, an inhibitor may be added along with an air sparge to prevent free radical polymerization from occurring. The reactor contents are heated to 38 to 43° C. The 2-HEMA is fed into the reactor over a period of five hours and then held for a further one hour while maintaining the temperature at 38 to 43° C. The reactor is heated to 46° C., 20% of the HEEU is added and the batch is held for a further 30 minutes. The batch is allowed to exotherm after the HEEU addition and is cooled to 46 to 52° C. over the 30 minute hold period. The remaining HEEU is added in four further 20% increments with similar hold periods, exotherms and cooling after each addition. The batch is then heated to 85° C., held at this temperature until all of the isocyanate groups have reacted, then cooled and removed from the reactor. The resulting monomer included cyclic urea and vinyl functional groups separated from one another by 15 intervening atoms, including two urethane linkages.

A vinyl polymer pigment dispersing agent was prepared by charging 836 parts of n-butyl acetate to a reactor and agitating under nitrogen while heating to 125° C. When the temperature stabilized at 125° C., the monomer and initiator feed shown below in Table A was delivered to the reactor:

TABLE A

| Ingredient | Parts | Wt. Percent |
|---|---|---|
| Stearyl methacrylate | 120.80 | 4.4 |
| Vinyl functional cyclic urea monomer | 76.59 | 2.8 |
| Styrene | 483.20 | 17.5 |
| n-Butyl acrylate | 651.13 | 23.6 |
| 2-HEMA | 229.52 | 8.3 |
| Methyl methacrylate | 748.48 | 27.1 |
| HEEUMA | 106.32 | 3.9 |
| 2,2-Azobis(2-methylisobutyronitrile) | 120.80 | 4.4 |
| t-Butyl peroxy-2-ethylhexanoate | 120.80 | 4.4 |
| n-Butyl acetate | 100.97 | 3.7 |
| Total | 2758.61 | 100.0 |

The feed ingredients were mixed in a separate vessel until homogenous prior to starting the feed, then added to the reaction vessel at an even rate over the course of about 4 hours. At 80 minutes into the feed, the temperature had increased from 125° C. to 128° C. After the feed was complete, the separate vessel and lines feeding the reaction vessel were rinsed with 114 parts n-butyl acetate and the batch was held at 128° C. for approximately 20 minutes. After the hold period, a premix containing 60.32 parts n-butyl acetate and 12.08 parts t-butyl peroxy-2-ethylhexanoate was fed from a funnel into the reaction vessel over a period of 35 minutes while the reaction vessel temperature was maintained at 128° C. After this feed was complete, the funnel was rinsed with 19.0 parts n-butyl acetate and the reaction vessel was held at 128° C. for a further 15 minutes. The batch was then cooled and poured.

Example 2

A pigment grind dispersion is prepared by combining 337.6 parts of the Example 1 vinyl polymer, 16.6 parts propylene glycol methyl ether acetate, and 35.8 parts n-butyl acetate in a stainless steel mixing vessel and mixing for 10 minutes using a Cowles-type dispersing blade operated at low speed. Next, 98.6 parts SOLSPERSE™ 32500 polymeric dispersant (commercially from Lubrizol Advanced Materials) are added to the vessel with agitation until the contents form a uniformly dispersed blend, followed by the addition under agitation of 85.6 parts ASP-170™ hydrous aluminum silicates (commercially available from BASF Corporation) and 300.0 parts RAVEN™ 410 carbon black pigment (commercially available from Columbian Chemical Company). After the pigment has been fully incorporated into the liquid mixture, the vessel contents are mixed with high speed agitation for 60 minutes. Next, 531.3 parts n-butyl acetate are added under agitation and the batch is recirculated in a media mill until the pigment is completely dispersed with a minimum 7 fineness of grind on the Hegman scale. Once the desired fineness of grind is obtained, an additional 50.5 parts of the Example 1 vinyl polymer and 23.3 parts n-butyl acetate are added. The dispersion is then ready to be filtered into containers, and exhibits excellent early stability.

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

We claim:

1. A vinyl polymer pigment dispersing agent comprising a solution polymer or water-dispersible polymer having:
    a) a vinyl addition polymer backbone;
    b) one or more polymer side chains comprising a pendant cyclic urea functional group separated from the polymer backbone by at least 10 intervening atoms; and
    c) one or more polymer side chains comprising pendant urea functional groups separated from the polymer backbone by less than 10 intervening atoms.

2. An agent according to claim 1, wherein the vinyl polymer is a solution polymer.

3. An agent according to claim 1, wherein the vinyl polymer is a water-dispersible polymer.

4. An agent according to claim 1, wherein the pendant cyclic urea functional groups are terminal groups on their respective polymer side chains 5. An agent according to claim 1, wherein the pendant cyclic urea functional groups are separated from the polymer backbone by 10 to 20 intervening atoms.

6. An agent according to claim 1, wherein the pendant cyclic urea functional groups are separated from the polymer backbone by two or more urethane groups derived from a monomeric polyisocyanate.

7. An agent according to claim 1, wherein the pendant cyclic urea functional groups are separated from the polymer backbone by two urethane groups derived from a monomeric diisocyanate.

8. An agent according to claim 1, wherein the pendant urea functional groups separated from the polymer backbone by less than 10 intervening atoms comprise cyclic urea groups.

9. An agent according to claim 1, wherein the vinyl polymer has one or more polymer side chains comprising pendant cyclic urea functional groups separated from the polymer backbone by less than 5 intervening atoms.

10. An agent according to claim 1 containing less than 2 weight percent pendant cyclic urea functional groups separated from the polymer backbone by at least 10 intervening atoms and less than 2 weight percent pendant cyclic urea functional groups separated from the polymer backbone by less than 5 intervening atoms.

11. An agent according to claim 1 containing less than 5 weight percent polymer side chains comprising a pendant cyclic urea functional group.

12. An agent according to claim 1 containing less than 2 weight percent polymer side chains comprising a pendant cyclic urea functional group.

13. An agent according to claim 1, wherein the vinyl addition polymer backbone is derived from styrene.

14. An agent according to claim 1, wherein the vinyl addition polymer backbone is derived from a fatty acid (meth)acrylate.

15. An agent according to claim 1, wherein the vinyl polymer has a hydroxyl number greater than 0 and less than about 200.

16. An agent according to claim 1, wherein the vinyl polymer has a hydroxyl number greater than about 20 and less than about 100.

17. An agent according to claim 1, wherein the vinyl polymer has an acid number less than about 20.

18. An agent according to claim 1, wherein the vinyl polymer has a weight average molecular weight greater than about 2,000.

19. An agent according to claim 1, wherein the vinyl polymer has a weight average molecular weight less than about 20,000.

20. A method for making a vinyl polymer pigment dispersing agent, which method comprises forming a solution polymer or water-dispersible polymer by addition polymerizing a mixture comprising:
 a) one or more vinyl monomers;
 b) one or more monomers having cyclic urea functional groups and vinyl functional groups separated from one another by at least 10 intervening atoms; and
 c) one or more other monomers having pendant urea functional groups and vinyl groups separated from one another by less than 10 intervening atoms.

21. A pigment grind dispersion, comprising a stable blend of:
 a) a vinyl polymer pigment dispersing agent comprising a solution polymer or water-dispersible polymer having:
  i) a vinyl addition polymer backbone; and
  ii) one or more polymer side chains comprising a pendant cyclic urea functional group separated from the polymer backbone by at least 10 intervening atoms;
 b) pigment particles; and
 c) a carrier.

22. A pigment grind dispersion according to claim 21, wherein the vinyl polymer is a solution polymer.

23. A pigment grind dispersion according to claim 21, wherein the vinyl polymer is a water-dispersible polymer.

24. A pigment grind dispersion according to claim 21, wherein the pendant cyclic urea functional groups are terminal groups on their respective polymer side chains.

25. A pigment grind dispersion according to claim 21, wherein the pendant cyclic urea functional groups are separated from the polymer backbone by 10 to 20 intervening atoms.

26. A pigment grind dispersion according to claim 21, wherein the pendant urea functional groups separated from the polymer backbone by less than 10 intervening atoms comprise cyclic urea groups.

27. A pigment grind dispersion according to claim 21, wherein the vinyl polymer has one or more polymer side chains comprising pendant cyclic urea functional groups separated from the polymer backbone by less than 5 intervening atoms.

28. A pigment grind dispersion according to claim 27, containing less than 2 weight percent pendant cyclic urea functional groups separated from the polymer backbone by at least 10 intervening atoms and less than 2 weight percent pendant cyclic urea functional groups separated from the polymer backbone by less than 5 intervening atoms.

29. A pigment grind dispersion according to claim 21, containing less than 5 weight percent polymer side chains comprising a pendant cyclic urea functional group

30. A pigment grind dispersion according to claim 21, wherein the vinyl addition polymer backbone is derived from styrene or from a fatty acid (meth)acrylate.

31. A pigment grind dispersion according to claim 21, wherein the vinyl polymer has a hydroxyl number greater than 0 and less than about 200.

32. A pigment grind dispersion according to claim 21, wherein the vinyl polymer has a weight average molecular weight greater than about 2,000 and less than about 20,000.

33. A method according to claim 20, comprising forming the vinyl polymer as a solution polymer.

34. A method according to claim 20, comprising forming the vinyl polymer as a water-dispersible polymer.

35. A method according to claim 20, wherein the one or more vinyl monomers comprise styrene or a fatty acid (meth) acrylate.

36. A method according to claim 20, wherein the cyclic urea functional groups are pendant groups.

37. A method according to claim 36, wherein the cyclic urea functional groups and vinyl groups in the one or more monomers having cyclic urea functional groups and vinyl functional groups are separated from one another by 10 to 20 intervening atoms.

38. A method according to claim 20, wherein the one or more other monomers having pendant urea functional groups and vinyl groups are separated from one another by less than 5 intervening atoms.

39. A method according to claim 20, wherein the one or more other monomers having pendant urea functional groups and vinyl groups comprise hydroxyethylethylene urea acrylate, hydroxyethylethylene urea methacrylate, acrylamidoethylethylene urea or methacrylamidoethylethylene urea.

40. A method according to claim 20, wherein the vinyl polymer contains less than 2 weight percent pendant cyclic urea functional groups separated from the polymer backbone by at least 10 intervening atoms and less than 2 weight percent pendant cyclic urea functional groups separated from the polymer backbone by less than 5 intervening atoms.

41. A method according to claim 20, wherein the vinyl polymer has a hydroxyl number greater than 0 and less than about 200 and a weight average molecular weight greater than about 2,000 and less than about 20,000.

* * * * *